United States Patent
Kempf

(10) Patent No.: US 7,139,035 B2
(45) Date of Patent: Nov. 21, 2006

(54) VIDEO NOISE FLOOR ESTIMATOR WITH IMPULSE NOISE DETECTION

(75) Inventor: Jeffrey Kempf, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 591 days.

(21) Appl. No.: 10/331,573

(22) Filed: Dec. 30, 2002

(65) Prior Publication Data

US 2004/0125236 A1 Jul. 1, 2004

(51) Int. Cl.
- H04N 5/21 (2006.01)
- H04N 5/213 (2006.01)
- H04N 5/217 (2006.01)
- G06K 9/38 (2006.01)
- G06K 9/40 (2006.01)

(52) U.S. Cl. ............ 348/607; 348/241; 348/622; 348/533; 382/260; 382/270

(58) Field of Classification Search .......... 348/606, 348/607, 617, 622, 627, 700, 241, 533–534, 348/683, 701, 909; 382/260–262, 272, 273, 382/275; H04N 5/21
See application file for complete search history.

(56) References Cited

U.S. PATENT DOCUMENTS

| | | | | |
|---|---|---|---|---|
| 4,364,087 A * | 12/1982 | Storey et al. | ............... | 348/155 |
| 5,764,307 A * | 6/1998 | Ozcelik et al. | ............... | 348/608 |
| 5,844,627 A * | 12/1998 | May et al. | ............... | 348/607 |
| 5,949,916 A * | 9/1999 | Chun | ............... | 382/261 |
| 6,005,626 A * | 12/1999 | Ding | ............... | 375/240.16 |
| 6,075,875 A * | 6/2000 | Gu | ............... | 382/107 |
| 6,205,257 B1 * | 3/2001 | Eschbach | ............... | 382/261 |
| 6,281,942 B1 * | 8/2001 | Wang | ............... | 348/607 |
| 6,330,345 B1 * | 12/2001 | Russo et al. | ............... | 382/115 |
| 6,343,146 B1 * | 1/2002 | Tsuruoka et al. | ............... | 382/163 |
| 6,359,658 B1 * | 3/2002 | He et al. | ............... | 348/607 |
| 6,427,031 B1 * | 7/2002 | Price | ............... | 382/264 |
| 6,433,819 B1 * | 8/2002 | Li et al. | ............... | 348/180 |
| 6,433,834 B1 * | 8/2002 | Nie | ............... | 348/607 |
| 6,678,330 B1 * | 1/2004 | Kondo et al. | ............... | 375/240.24 |
| 6,678,424 B1 * | 1/2004 | Ferguson | ............... | 382/286 |
| 6,687,410 B1 * | 2/2004 | Brown | ............... | 382/239 |
| 6,771,793 B1 * | 8/2004 | Yamada | ............... | 382/264 |
| 6,788,819 B1 * | 9/2004 | Swann et al. | ............... | 382/224 |
| 6,819,804 B1 * | 11/2004 | Tenze et al. | ............... | 382/262 |
| 6,847,738 B1 * | 1/2005 | Scognamiglio et al. | ............... | 382/260 |
| 6,879,732 B1 * | 4/2005 | Sokolov | ............... | 382/275 |
| 6,941,026 B1 * | 9/2005 | Nadabar et al. | ............... | 382/265 |
| 2001/0019633 A1 * | 9/2001 | Tenze et al. | ............... | 382/261 |
| 2003/0052979 A1 * | 3/2003 | Soga et al. | ............... | 348/241 |
| 2004/0012720 A1 * | 1/2004 | Alvarez | ............... | 348/607 |
| 2004/0012721 A1 * | 1/2004 | Alvarez | ............... | 348/618 |

* cited by examiner

Primary Examiner—Brian P. Yenke
(74) Attorney, Agent, or Firm—Charles A. Brill; Wade James Brady, III; Frederick J. Telecky, Jr.

(57) ABSTRACT

A method of detecting both linear and non linear noise in video data. Linear noise is detected on a line-by-line basis, by blocks within each line. Non linear noise is detected during horizontal blanking periods. The method provides a noise floor value for linear noise and an impulse noise flag for non linear noise, both of which are delivered to a noise reduction filter.

20 Claims, 1 Drawing Sheet

VIDEO NOISE FLOOR ESTIMATOR WITH IMPULSE NOISE DETECTION

TECHNICAL FIELD OF THE INVENTION

This invention relates to image processing, and more particularly to a method of calculating a noise floor in video images, as well as impulse noise.

BACKGROUND OF THE INVENTION

Noise in video equipment may arise from electrical distortions and interference created by power supply hum interactions between internal electrical components, etc. Noise may also be in the form of distractions from the pure signal transference, modification or amplification. For example, conversion between analog and digital domains leads to noise. Any of these factors or a combination of them, can combine to adversely affect the signal to noise ratio (SNR).

Although some noise is found in all video systems, the lower the noise rating of a component the better. Noise can be a problem if one wants to attain enhanced detail. At some point, the signal actually is lower in power than the noise itself (the noise floor), resulting in the true signal being obscured. The lower the noise floor of a component, the smaller a signal the system can cleanly produce and the more detail the system may have at low levels. Stated in other words, the "noise floor" is the point at which the volume or power of noise is greater than the volume or power of an intended and desired signal effectively covering up and obscuring that signal.

Various noise reduction techniques have been developed to improve the image quality of noisy video. Typically, these noise reduction techniques increase the SNR by smoothing the image sequence in the temporal or spatial domains. The amount of smoothing should be proportional to the noise floor of the incoming image sequence. Too much temporal smoothing results in motion blur, and too much spatial smoothing results in loss of detail.

Smoothing techniques are "linear" and are used to mitigate noise that arises from Gaussian noise injection. Non-linear techniques, such as a median filter, are used to mitigate impulse noise, such as the noise that results from spikes on the transmission line.

DETAILED DESCRIPTION OF THE INVENTION

The following description is directed to a method for determining the type of noise reduction filter (linear or non linear) appropriate for a particular incoming stream of video data. This is accomplished by detecting both linear noise and impulse (non linear) noise. If the noise is linear, a noise floor is calculated so that it can also be determined how much smoothing to perform.

Figure 1:
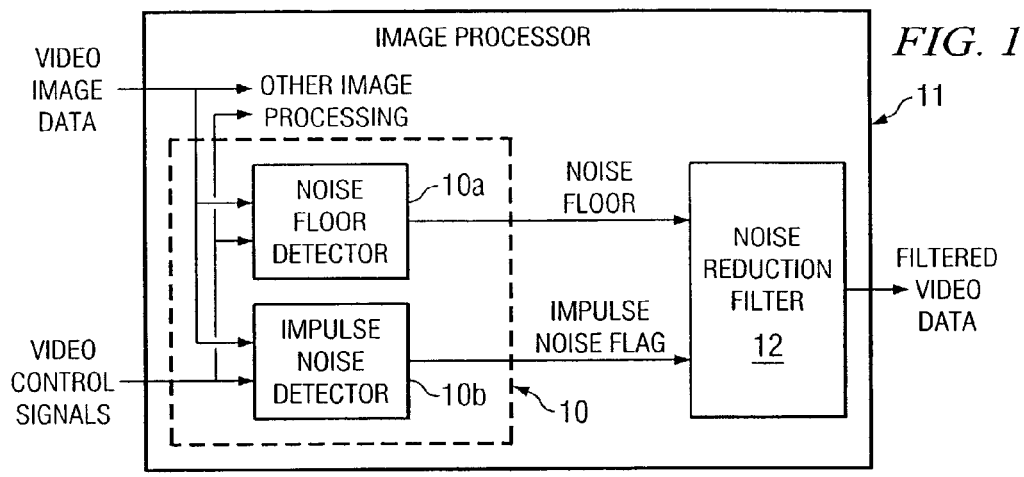
FIG. 1 illustrates a noise detector in accordance with the invention, as used in an image processing system.

FIG. 1 illustrates a noise detection unit 10 in accordance with the invention. As indicated, noise detection unit 10 is implemented with programming and a processor, which may be incorporated into a larger image processing system 11. Apart from the features of the present invention, image processing system 11 may be implemented with known techniques and processing and memory devices. Image processing system 11 includes a noise reduction filter 12, which implements algorithms for smoothing and impulse noise reduction.

Noise detection unit 10 receives input video data, which includes the image data and control signals. It is assumed that the data is digital, but if not, image processing unit 11 may also be used to perform analog to digital conversion.

Noise detection unit 10 has a noise floor detector 10a and an impulse noise detector 10b, which are explained below in connection with FIGS. 1 and 2 respectively. Noise floor detector 10a provides a noise floor value to noise reduction filter 12, which uses the noise floor value to adjust smoothing algorithms. Impulse noise detector 10b delivers an impulse noise flag, which determines whether filter 12 will perform non linear filtering.

Filter 12 is adaptable, such that it may perform linear or non linear filtering or both on a given frame of data. In the embodiment of this description, linear and non linear filtering determinations are made on a frame by frame basis. However, a variety of other schemes for using the data provided by noise detection unit 10 could be used. For example, filtering decisions could be made after any nth frame, or filtering could be modified in accordance with predetermined variances in the noise floor regardless of periodicity of frames.

Figure 2:
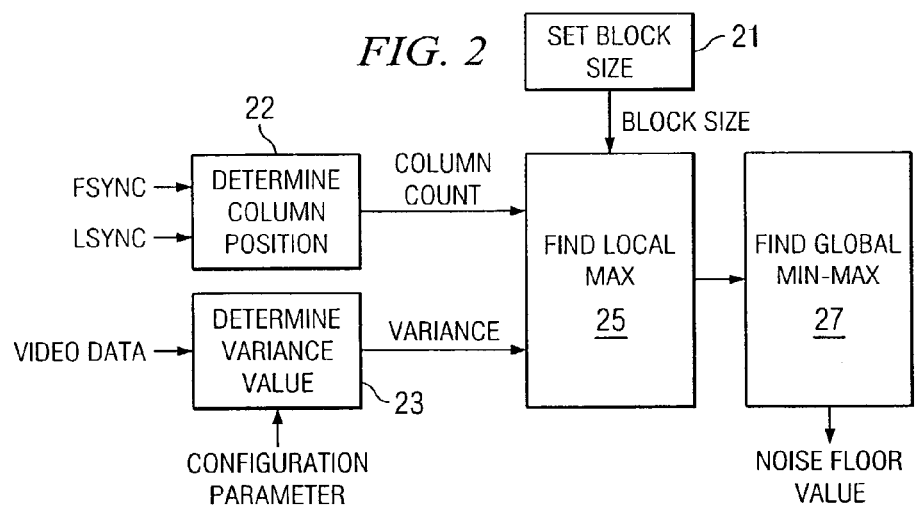
FIG. 2 illustrates the method implemented by the noise floor detector of FIG. 1.

FIG. 2 illustrates a method of determining a noise floor in accordance with the invention. This method may be implemented with programming and processing devices appropriate for noise floor detector 10a. In FIG. 2, the steps are set out for a single image frame, and these steps are performed continuously for each frame by noise floor detector 10a.

As explained below, the noise floor is determined by calculating the amount of variance in flat spatial regions of the incoming video data. Typically, natural images contain large areas of a single color. High frequency variations within these flat fields may be attributed to noise.

Step 21 is dividing an image frame into blocks. The height of each block is one line. The width of each block is programmable in terms of a number of pixels, up to the length of the line.

Step 22 is receiving each current pixel of the incoming data and determining its column position. This is accomplished on the basis of the control signals, FSYNC, LSYNC, and IVALID. FSYNC is the frame sync signal, which is asserted for one clock at the beginning of each incoming frame. LSYNC is the line sync signal, which is asserted for one clock before each active line. IVALID is the input valid signal, which is asserted for each active pixel.

As an example of Step 22, pseudo code for determining a column position could be expressed as follows:

If FSYNC=1
        column count=0
    Else if LSYNC=1
        column count=0
    Else if IVALID=1
        column count=column count+1

The output of Step 22 is a value representing the column position of the current pixel. This value is used as a count in Step 25.

Step 23 is determining a current variance value for each pixel. There are typically multiple data channels for the incoming data. For example, the data channels may represent RGB data, with streams of three n-bit red, green, and blue component data values. Or, the data channels may represent luminance-chrominance (YCrCb) data, with streams of n-bit luminance, blue minus luma color difference, and red minus luma color difference values. In the example of FIG. 2, noise detector 10a is configurable to operate with either type of data, and a configuration parameter is used to specify whether the input is RGB or YCbCr data. In other embodiments, noise detector 10a could be configured for only one type of data.

In Step 23, the current variance for each channel is determined by calculating the absolute difference between horizontally adjacent pixels. For RGB data, the overall variance is set equal to the maximum variance among the color components. For YCrCb data, the overall variance is set equal to the variance on the luminance channel. To avoid clipping effects, the variance is set to its maximum (255 for 8 bit data) for input values above or below certain threshold values.

Example pseudo code for implementing Step 23 is as follows, where the input data is RGB data. Each channel's current pixel, n, has three values, a(n), b(n), and c(n). The variance for each new pixel, n, is calculated as:

```
avar = abs(a(n) − a(n−1))
bvar = abs(b(n) − b(n−1))
cvar = abs(c(n) − c(n−1))
If source = RGB
    If ((a(n) > 240 OR a(n)< 15)) AND
       ((b(n) > 240 OR b(n)< 15)) AND
       ((c(n) > 240 OR c(n)< 15))
           variance = 255
    Else
           variance = max(avar, bvar, cvar)
```

In the pseudo code example above, the clipping thresholds were set at 240 and 15.

Step 25 is finding the maximum for each block, that is, the "local" maximum. The local maximum for each block is the largest variance within the current block.

Step 27 is determining the minimum variance among all blocks of the frame. Referring again to FIG. 1, this value is delivered to the noise reduction filter 12.

The following is example pseudo code for Steps 25 and 27:

```
If FSYNC = 1
    noise floor = previous local maximum
    local maximum = −1
    previous local maximum = 9999
Else if IVALID = 1
    If remainder(column count/block size) = 0
        If (local maximum<previous local maximum)
            previous local maximum = local maximum
        End
        local maximum = variance
    Else
        If (variance > local maximum)
            local maximum = variance
        End
    End
End
```

The variable "previous local maximum" is the minimum block variance from all previously calculated blocks of the frame. At the end of a frame, "previous local maximum" has the noise floor value for the current frame.

In the above-described embodiment, the maximum variance within each block was calculated by calculating a variance value for each current pixel in the block. The variance is the difference in value between the current pixel and its immediately preceding pixel. Other techniques for finding a maximum variance within each block could be used—for example, it may not be deemed necessary to calculate a variance for each and every pixel in the block.

As stated in the Background, impulse noise creates spikes of full on or full off intensity. Impulse noise is detected by observing the data stream during horizontal blanking, which is the time between active lines. By observing the data during horizontal blanking, false impulse detection is avoided. More specifically, in an image, there may be naturally occurring structures that appear to be impulse noise. For example, a vertical line observed horizontally would appear as an impulse.

Figure 3:
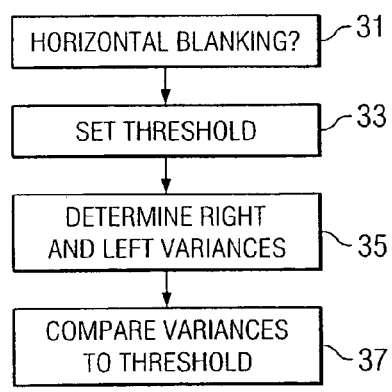
FIG. 3 illustrates the method implemented by the impulse noise detector of FIG. 1.

FIG. 3 illustrates a method of detecting impulse noise in accordance with the invention. This method may be implemented with programming and processing devices appropriate for impulse noise detector 10b.

Step 31 is determining when the incoming video stream is in the horizontal blanking period. If so, the impulse noise detection is performed during this time.

Step 33 is setting an impulse variance threshold. Variance values above this threshold will be considered to be impulse noise.

Step 35 is calculating left and right variances for each current pixel value. Where the data is RGB data, left and right variances are calculated for each channel. For YCrCb data, the left and right variances on the luminance channel are calculated. Like noise floor detector 10a, impulse noise detector 10b could be configurable for either RGB or luminance-chrominance data.

Step 37 is comparing the variances to the threshold. If both the left and right variances are above the threshold, a local impulse signal is set to signify the detection of an impulse during horizontal blanking.

Step 39 is delivering an impulse noise flag to the noise reduction filter. In one embodiment, detection of impulse noise in any line of a frame could be used to trigger impulse filtering for that frame. In other embodiments, the results of the impulse detection for multiple lines in a frame could be counted or otherwise analyzed to determine if impulse filtering is to be performed. For example, a more robust embodiment might require n lines per frame to indicate impulse noise before an impulse noise flag is delivered to filter 12.

The following is an example of pseudo code, which may be used to implement impulse noise detector 10b for RGB data, where each channel's current pixel, n, has three values, a(n), b(n), and c(n:

```
If FSYNC=1
    impulse detected=local impulse
    local impulse=0
Else if IVALID=0
    alvar=abs (a(n)−a(n−1))
    blvar=abs (b(n)−b(n−1))
    clvar=abs (c(n)−c(n−1))
    arvar=abs (a(n)−a(n+1))
    brvar=abs (b(n)−b(n+1))
    crvar=abs (c(n)−c(n+1))
    If ((alvar>threshold AND arvar>threshold)) OR
```

```
((blvar>threshold AND brvar>threshold)) OR
((clvar>threshold AND crvar>threshold))
   local impulse=1
End
End
```

As indicated, at the beginning of each frame, "impulse detected" is set equal to "local impulse" and "local impulse" is reset to zero.

In the above-described embodiment, left and right variances were calculated for each pixel of a line during the horizontal blanking period. However, other techniques could be used, such as using fewer than all pixels in the line.

Noise detection unit 10 provides information for automatic noise reduction parameter adjustment, for use by noise reduction filter 12. Not only can the amount of smoothing be optimized for the current noise floor, but the noise reduction filter 12 itself can be adapted according to the type of noise. In contrast to the present invention, conventional noise reduction techniques require a manual adjustment of these parameters, as part of a trial and error process based on visual inspection.

With minimal hardware cost, automatic noise reduction parameter adjustment can be achieved. The process is not a two-dimensional process, but rather is one dimensional. In other words, only horizontally adjacent pixels are examined. Therefore, expensive line memories are not required.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A method of calculating a noise floor in video image data, comprising the steps of:
   selecting a block size within lines of the image data;
   within each block of a frame determining multiple variance values;
   from the multiple variance values for each block, determining a maximum variance value within each block of a frame of the image data;
   finding the minimum of the maximum variance values for that frame; and
   generating a noise floor value representing the results of the finding step.

2. The method of claim 1, wherein the image data is RGB component data, and the step of determining a maximum variance value is performed by determining a maximum variance value for each component within the block.

3. The method of claim 1, wherein the image data is luminance-chrominance data, and the step of determining a maximum variance value is performed by determining the maximum variance of the luminance data within the block.

4. The method of claim 1, wherein the maximum variance within each block is determined by calculating a variance value for each pixel in the block.

5. The method of claim 1, wherein the maximum variance within each block is determined by subtracting each current pixel value from its preceding pixel value.

6. The method of claim 1, wherein the step of determining a maximum variance value for each block includes setting a maximum variance value for pixel values above or below a predetermined threshold.

7. The method of claim 1, wherein the steps are repeated such that a noise floor value is calculated for each frame of the image data.

8. A method of detecting impulse noise in video image data, comprising the steps of:
   setting an impulse noise threshold;
   detecting a horizontal blanking period associated with a current line of the image data;
   during the horizontal blanking period, calculating left and right variances for a number of pixels within the current line;
   comparing the left and right variances to the threshold; and
   if both the left and right variances exceed the threshold, generating a local impulse noise signal.

9. The method of claim 8, wherein the image data is RGB component data, and the step of determining left and right variances is performed by determining left and right variances for each component.

10. The method of claim 8, wherein the image data is luminance-chrominance data, and the step of determining left and right variances is performed by determining left and right variances of the luminance data.

11. The method of claim 8, wherein the left and right variances are determined by calculating left and right variances for each pixel in the current line.

12. The method of claim 8, wherein the left and right variance within each block is determined by subtracting each current pixel value from its left and right neighbor pixel values.

13. The method of claim 8, further comprising the steps of generating an impulse noise flag based on one or more impulse noise signals.

14. A noise detection unit for use in an image processing system having a noise reduction filter, comprising:
   a noise floor detector, operable to determine a maximum variance value within blocks of a frame, wherein each block is one or more segments of a line; to find the minimum of the maximum variance values for that frame; and to deliver a noise floor value representing the minimum to the noise reduction filter; and
   an impulse noise detector operable to detect the horizontal blanking period of the image data; during the horizontal blanking period, to calculate left and right variances for a number of pixels within the current line; to compare the left and right variances to a threshold; if both the left and right variances exceed the threshold, to generate a local impulse signal; and to deliver an impulse noise flag to the noise reduction filter based on one or more local impulse signals.

15. The noise detection unit of claim 14, wherein the image data is RGB data.

16. The noise detection unit of claim 14, wherein the image data is luminance-chrominance data.

17. The noise detection unit of claim 14, wherein the noise floor detector is configurable for either RGB or luminance-chrominance data.

18. The noise detection unit of claim 14, wherein the impulse noise detector is configurable for either RGB or luminance-chrominance data.

19. The noise detection unit of claim 14, wherein the noise floor detector delivers a noise floor value for every frame of data.

20. The noise detection unit of claim 14, wherein the impulse noise detector delivers an impulse noise flag every for every line of image data.

* * * * *